United States Patent [19]
Kuroki

[11] 3,940,958
[45] Mar. 2, 1976

[54] STEERING LOCK FOR VEHICLES

[75] Inventor: Shigenori Kuroki, Miyazaki, Japan

[73] Assignee: Kabushiki Kaisha Honda Lock, Japan

[22] Filed: Dec. 19, 1974

[21] Appl. No.: 534,174

[30] Foreign Application Priority Data
Dec. 26, 1973  Japan.................................. 49-4810

[52] U.S. Cl.................................... 70/186; 70/252
[51] Int. Cl.² ........................................ B60R 25/02
[58] Field of Search ............ 70/184, 185, 186, 252, 70/380

[56] References Cited
UNITED STATES PATENTS
3,794,796  2/1974  Dwan.................................. 200/44

*Primary Examiner*—Albert G. Craig, Jr.
*Attorney, Agent, or Firm*—Polster and Polster

[57] ABSTRACT

A steering lock for vehicles such as motor cars, motorcycles, etc. of a construction, wherein a circular cam is fitted on an operating shaft which is integrally formed with an inner barrel of a cylinder lock in a manner to be rotatable with the operating shaft, a sliding member is provided so as to be engaged and held on the peripheral surface of the circular cam, a locking pin is fitted onto this sliding member, whereby, when the operating shaft is turned to a locking direction, the sliding member is pushed in the direction perpendicular to the operating shaft by means of an eccentric pin provided on the circular cam, while releasing the sliding member from its engaged relationship with the circular cam by means of a notch formed in the circular cam, and the locking pin is thus engaged with the locking hole provided in a shaft of a steering wheel.

3 Claims, 6 Drawing Figures

(2) LOCK  (1) OFF  (3) RUN  (4) PARKING

STEERING LOCK FOR VEHICLES

This invention is concerned with a safety lock, and, more particularly, it relates to a steering lock device adapted in various automotive vehicles such as motor cars, motorcycles, and so forth.

It is a primary object of the present invention to provide a safety lock device for a steering wheel in various automotive vehicles.

It is another object of the present invention to provide a safety steering lock device for automotive vehicles, wherein an electrical switch for engine actuation, and a locking mechanism for a steering wheel are integrally built so as to be operated by one and same key without any apprehension whatsoever of mistaken operation due to vibrations, etc. caused in the vehicle during its running.

Briefly speaking, according to the present invention, there is provided a steering lock device for vehicles, which comprises in combination a casing for the lock device defining a cavity therein, a cylinder type lock provided in contiguity to the casing, and having an outer barrel and an inner barrel, both being arranged concentrically, an operating shaft integrally and concentrically formed with the inner barrel of the cylinder lock in a manner rotatable together, the operating shaft extending into the casing, a circular cam slidably supported on and integrally rotatable with the operating shaft, the cam having therein a notched portion, and accommodated in the casing, an eccentric pin provided on one surface part of the circular cam, a sliding member which is engaged with and held on the peripheral surface of the circular cam, and is movable in the direction perpendicular to the axial direction of the operating shaft along a through-hole provided therein in that direction, and a locking member fitted on one part of the sliding member, the sliding member being pushed in the direction perpendicular to the operating shaft by means of the eccentric pin, when the operating shaft is turned to a locking direction, while releasing the sliding member from its engaged relationship with the circular cam by means of the notched portion in the circular cam, whereby the locking means becomes engaged with a steering wheel shaft at a locking portion thereof.

The foregoing objects and other objects of the present invention as well as detailed construction and operations thereof will become more understandable from the following detailed description thereof, when read in conjunction with the accompanying drawing.

Figure 1:
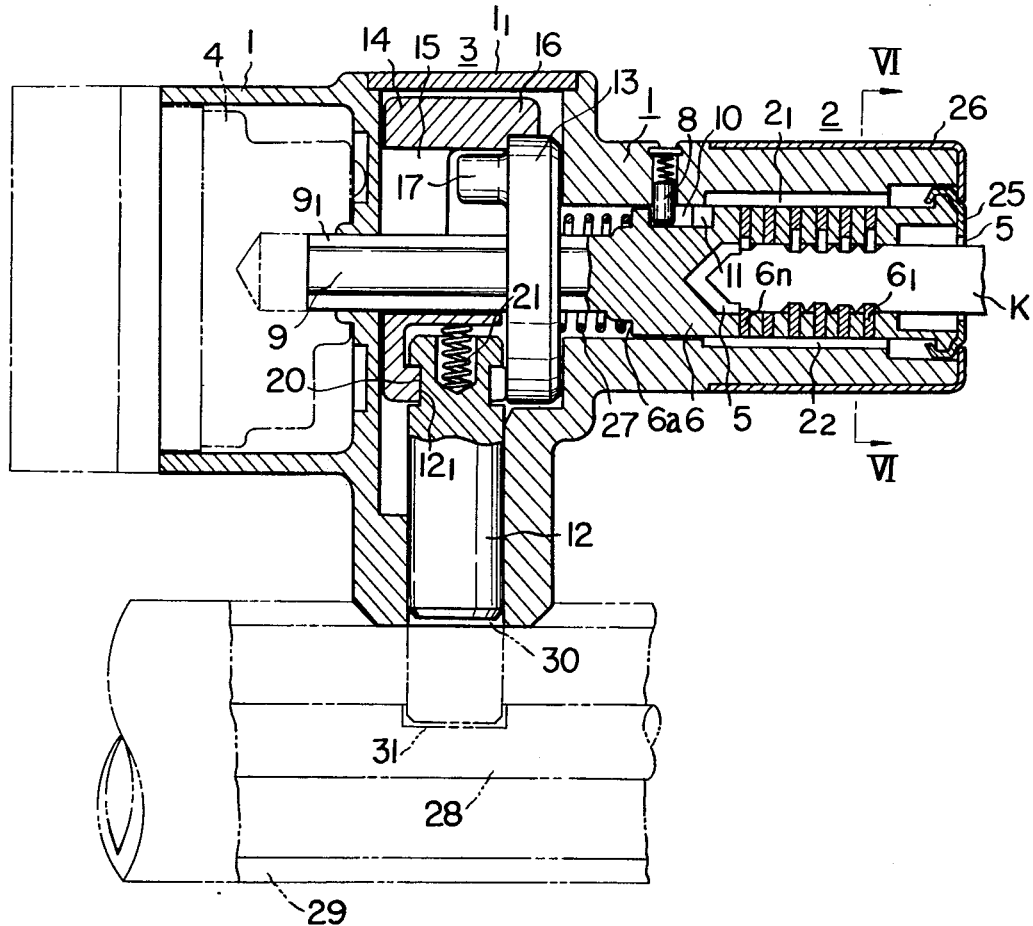
FIG. 1 is a longitudinal cross-section showing in detail the main part of a steering lock device according to the present invention.
Figure 6:
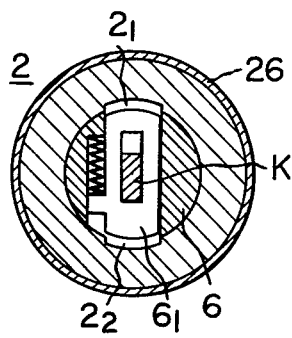
Figure 5:
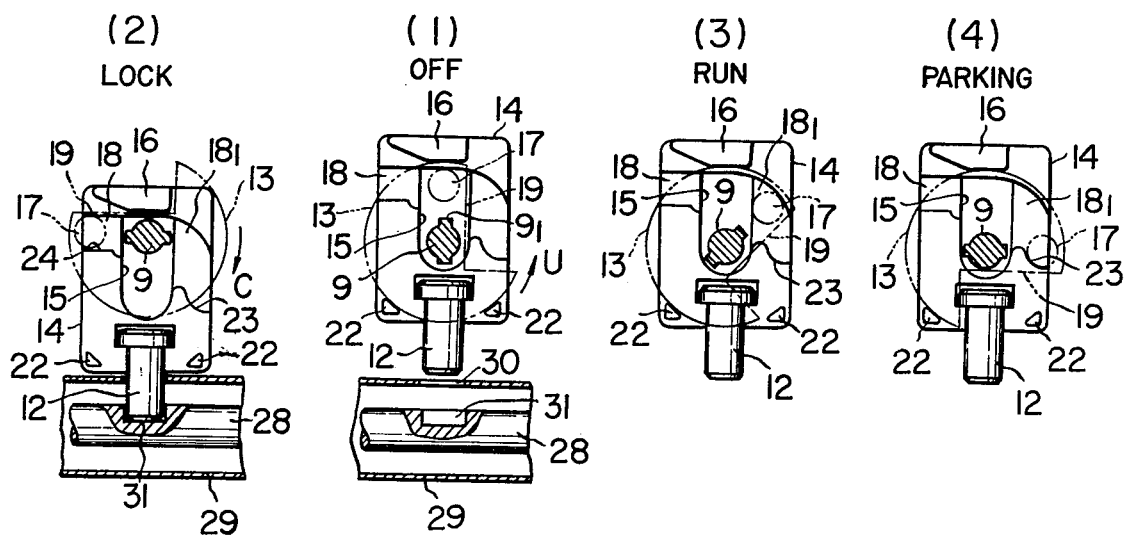

FIGS. 5(1), 5(2), 5(3), and 5(4) respectively indicate the operational position of the steering lock mechanism according to the present invention; and FIG. 6 is a cross-sectional view of the cylinder type lock taken along the line VI—VI in FIG. 1.

Figure 2:
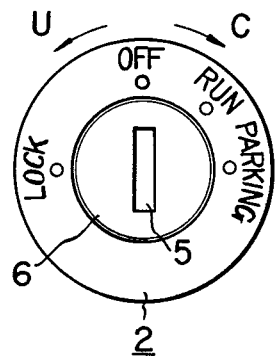
FIG. 2 is a front view of a cylinder type lock for use in the present invention.
Figure 3:
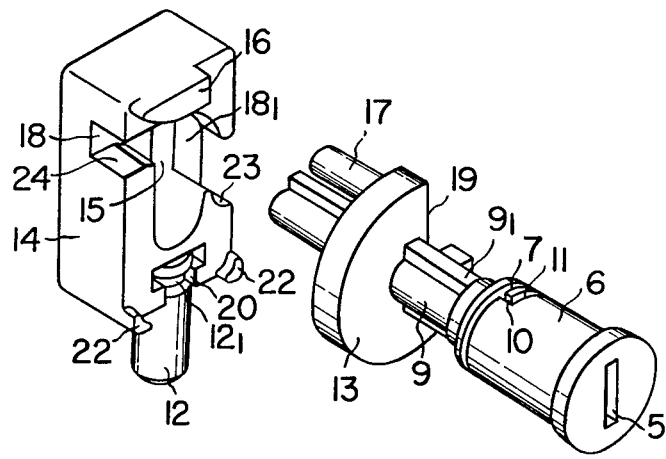
FIG. 3 is a perspective view of the main part of the steering lock device shown in FIG. 1.

Referring now to FIG. 1, the steering lock device according to the present invention consists principally of a main body or casing 1, a cover $1_1$ to close an opening formed in one part of the casing 1 to accommodate mechanical assembly in the casing, a cylinder type lock 2, a locking mechanism 3, and a switch body 4. Incidentally, FIG. 1 shows the steering lock mechanism in its released state, and the switch in its "OFF" state. When a key K is inserted into a key hole 5 formed in the inner barrel 6 of the cylinder lock 2 to release engagement of the blade tumblers $6_1$ to $6_n$ with the engaging grooves $2_1$ and $2_2$, and then the inner barrel 6 is turned in the clockwise direction C, the arcuate groove 7 formed in the inner barrel 2 rotates by approximately 90° along a control pin 8 provided on the outer barrel which is integrally formed with the main body 1 for the cylinder lock 2 upto the position of "RUN-PARKING" as shown in FIG. 2, whereupon the switch operating shaft 9 integrally formed with the inner barrel 6 causes a movable contact holder provided in the switch body 4 to rotate, thereby closing the switch.

In the state shown in FIG. 1, since the control pin 8 contacts the side surface (as indicated with diagonal hatch lines) of a control groove 10 formed in one part of the inner barrel 6, it is not possible to turn the key K in the locking direction "U". Then, when the key K is further pushed forward, the inner barrel 6 is also pushed forward by way of the blade tumblers $6_1$ through $6_n$ inclusive engaged therewith for a length of the control groove 10 communicated to the arcuate groove 7 against force of a coil spring 27, whereby the control pin 8 is brought to a position at one end of a groove 11 inclined with respect to the axis of the inner barrel 6. At this position, if the inner barrel 6 is rotated by approximately 90° in the anticlockwise direction "U", the locking pin 12 interlinked with the operating shaft 9 is pushed out as shown in FIG. 1, where indicated with a chain line, to project from a hole 30 formed in a column 29 covering a steering wheel shaft 28 and to be engaged with a locking hole 31 of the steering wheel shaft 28, thereby locking the steering wheel.

At the time of the locking, the inner barrel 6 retreats to its initial position by the actions of the inclined groove 11 and the spring 27, whereby the control pin 8 is located at a shallow arcuate groove $7_1$ formed on the extension of the arcuate groove 7. Also, at the time of the locking, the operating shaft 9 and the movable contact holder in the switch body 4 are not engaged mutually, whereby the switch 14 is maintained at an "OFF" state.

When the key K is rotated in the clockwise direction without the inner barrel 6 being moved by pushing, the arcuate groove $7_1$ shifts along the control pin 8 to return to the "OFF" position.

In this consequence, the steering wheel cannot be successfully locked without carrying out the two-stage operation of pushing and turning the key in this "OFF" position of the electric switch, hence there is no possibility of mistaken operation.

Figure 4:
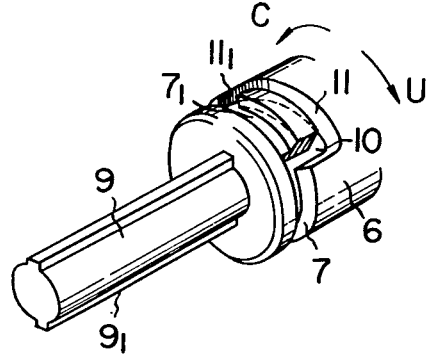
FIG. 4 is also a perspective view showing a part of an inner barrel of the cylinder lock according to the present invention.

When the arcuate groove 7, the control groove 10, and the inclined groove 11 provided in the inner barrel 6 of the cylinder lock 2 as shown in FIG. 4 are disposed in an opposite position in their front-and-back relationship with respect to the control pin 8, it becomes possible that the locking device is designed in a "pull-type", wherein the key K and the cylinder lock inner barrel 6 is pulled for the length of the control groove 10 at the "OFF" position thereof and then turned to the anticlockwise direction "U" for locking.

In the steering lock device of a construction as described in the foregoing, there has heretofore been employed as the interlocking means for the operating shaft 9 formed integrally with the cylinder lock inner barrel 6 and the locking pin 12, the up-and-down movement of a locking pin holding member 14 by an eccentric pin 17 provided on a circular cam 13 at the lcoking side of the operating shaft 9. On account of this, when the lock is set at a position of "RUN" just at the upper right hand as shown in FIG. 2, for example, the eccentric pin 17 spontaneously rotates due to vibrations, impact, etc. caused in the vehicle during its running, thereby turning the switch 4 to a "PARKING" position to possibly and apprehensively perform erroneous operation. Also, depending on the angular and directional positions of the eccentric pin 17, the locking operation becomes unfavorably irregular with respect to each of the key positions of "OFF-RUN" and "RUN-PARKING", for example.

Moreover, there might take place such a trouble that water, sand, dust, and so on creep in the tumbler engagement and disengagement parts between the inner and outer barrels to make it difficult to maintain smooth locking function. The present invention is directed to removal of such problems, for the purpose of which improvements have also been made in the interlocking mechanism for the cylinder lock inner barrel and the locking pin, and a cover cap for the end surface of the cylinder lock.

The locking mechanism according to the present invention comprises a circular cam 13 mounted on the operating shaft 9 in a manner slidably engageable therewith in its axial direction, an eccentric pin 17 provided on one part of the circular cam 13, a sliding member 14 which is engageable with the abovementioned cam 13 and moves up-and-down in the direction perpendicular to the axial direction of the operating shaft 9, the locking pin 12 is fitted to this sliding member 14, and other known means such as a slide key, and others.

There are further provided in this sliding member 14 a hole 15 having a vertically extended cross-section to permit the operating shaft 9 to pass therethrough, an upper engagement part 16 to be engaged with the peripheral surface of the circular cam 13, lower left and right engagement parts 22 and 22, and engaging groove 18 to allow the eccentric pin 17 of the circular cam 13 to enter therein, and an escapement groove $18_1$ for the eccentric pin 17 associated with the engaging groove 18. Also, an escapement notch 19 with respect to the engagement part 16 is formed in the circular cam 13. The locking pin 12 should preferably be inserted at its head part $12_1$ into a notch 20 of the sliding member 14 and pressed by a spring 21 for stopping play. The engagement parts 16 and 22 protrude from the surface of the sliding member 14 to be engaged with the peripheral surface of the circular cam 13, while the engagement groove 18 and the escapement groove $18_1$ for the abovementioned eccentric pin 17 are formed in a recession from the abovementioned surface of the sliding member 14.

In the state of the switch being "OFF" and the steering lock being released as in FIG. 1, the sliding member 14 is pushed upward by the circular cam 13 and the locking pin 12 is off the hole 30 of the steering wheel column 29 as shown in FIG. 5(1).

When the cylinder lock inner barrel 6 and the operating shaft 9 are turned by approximately 90 degrees in the anticlockwise direction as described above, the circular cam 13 also rotates integrally, and, following the downward rotation of the eccentric pin 17, the sliding member 14 and the locking pin 12 are pushed downward through the engagement groove 18 as shown in FIG. 5(2) to be engaged with the locking hole 31, thereby completing the steering lock. At this time, the notch 19 of the circular cam 13 is at the position of the engagement part 16, and the sliding member 14 goes down along the shape of the hole 15 without any difficulty and hindrance.

When the operating shaft 9 is turned by approximately 90 degrees in the clockwise direction C from the position in FIG. 5(2), the sliding member 14 is pushed upward by the eccentric pin 17 to return to the original "OFF" position. Further, when the operating shaft 9 is to be turned to the respective positions of "RUN" and "PARKING" as indicated in FIGS. 5(3) and 5(4), the sliding member 14 is held at the peripheral surface of the circular cam 13, and the eccentric pin 17 is moved along the escapement groove $18_1$ until it strikes the stopper 23, thereby maintaining the lock release state.

As stated in the foregoing, the sliding member 14 is maintained in the lock release position through the engagement parts 16, 22 at the peripheral surface of the circular cam 13 during the running of the vehicle, in which the steering wheel is free from locking and the sliding member 14 and the circular cam 13 are in a relationship of integral combination each other, so that there takes place no awkward situation such that the position of the lock spontaneously shifts from "RUN" to "PARKING" due to vibrations, impacts, and any other external influences caused in the vehicle body, hence the device according to the present invention is highly safe. Moreover, as the circular cam 13 is employed, the turning of the key for the required lock and release operations can be performed very smoothly without any irregularity and inconsistency.

Moreover, in the afore-described construction of the steering lock for vehicles according to the present invention, a coil spring 27 is interposed between the circular cam 13 and the notched part 6a of the cylinder lock inner barrel 6 to press-contact the circular cam 13 to the sliding member 14 so as to secure tight engagement between the sliding member and the peripheral surface of the circular cam. Also, the retreat of the inner barrel 6 by the force of the coil spring 27 is stopped by setting the outer peripheral end surface of the cap 25 fitted at the outer end surface of the inner barrel in close contact with the inner surface of the opening of the body cap 26. Accordingly, any liability to damage in the thin control pin 8 takes place by a pushing force exerted at the time of the retreat of the inner barrel 6. Furthermore, as the caps 25 and 26 are always in close contact each other to block the engagement and disengagement between the inner barrel 6 and the outer barrel, except for their "OFF" to "LOCK" operations as described in the foregoing, undesirable invasion of water, sand, dust, etc. into the mechanical casing can be sufficiently prevented, and the operation of the lock can always be maintained in a smooth conditions.

Although the present invention has been described in the foregoing with particular reference to a preferred embodiment, it should be understood that this is merely illustrative and not restrictive, and any change and modification may be effected within the spirit and scope of the present invention as recited in the appended claims.

What is claimed is:

1. A safety lock for steering device in automobile vehicle, which comprises in combination:
   a. a casing for said lock device defining a cavity therein;
   b. a cylinder type lock provided in contiguity to said casing and having an outer barrel and an inner barrel, both being arranged concentrically;
   c. an operating shaft integrally and concentrically formed with said inner barrel of said cylinder lock in a manner rotatable together, said operating shaft extending into said casing;
   d. a circular cam slidably supported on and integrally rotatable with said operating shaft and accommodated in said casing, said cam having therein a notched portion;
   e. an eccentric pin provided on one surface part of said circular cam;
   f. a sliding member provided with an engagement groove, an escapement groove, and a plurality of engagement members, said sliding member being engaged with and held on the peripheral surface of said circular cam, and being movable in the direction perpendicular to the axial direction of said operating shaft, along a through-hole formed therein in said direction, according as said eccentric pin on said circular cam is allowed to pass along said escapement groove thereof to be engaged with said groove, when said operating shaft is turned to a locking direction, while releasing said sliding member from its engaged relationship with said circular cam by means of said notched portion in said circular cam; and
   g. a locking means fitted on one part of said sliding member in a manner to be engageable with a steering shaft at a locking position thereof by the engagement action of said sliding member.

2. The steering lock for vehicles as claimed in claim 1, further comprising a spring means interposed between said circular cam means and said inner barrel of said cylinder lock to cause said circular cam means to maintain tight contact with said sliding member and permit tight closure of the outer peripehral end part of said cylinder lock.

3. In a safety lock for steering shaft in an automotive vehicle having a casing for said lock device defining a cavity therein, a cylinder type lock provided in contiguity to said casing and having an outer barrel and an inner barrel, both being arranged concentrically, an operating shaft extending into said casing and integrally and concentrically formed with said inner barrel of said cylinder lock in a manner rotatable together, a circular cam having therein a notched portion and slidably supported on and integrally rotatable with said operating shaft and accommodated in said casing, an eccentric pin provided on one surface part of said circular cam, a sliding member which is engaged with and held on the peripheral surface of said circular cam through said engagement members, and is movable in the direction perpendicular to the axial direction of said operating shaft along a through-hole provided therein in said direction, and a locking means fitted on one part of said sliding member, the improvement comprising said sliding member including a hole formed in a vertically extending cross-section to permit said operating shaft to pass therethrough, an upper engagement member to be engaged with the peripheral surface of said circular cam, lower left and right engagement members, an engagement groove to allow said eccentric pin on said circular cam to enter therein, and an escapement groove for said eccentric pin associated with said engagement groove, said engagement members protruding from the surface of said sliding member to be engaged with the peripheral surface of said circular cam through said engagement members, and being movable in the direction perpendicular to the axial direction of said operating shaft along a through-hole formed therein in said direction according as said eccentric pin on said circular cam is allowed to pass along said escapement groove of said sliding member and engaged with said engagement groove, when said operating shaft is turned to a locking direction, while releasing said sliding member from its engaged relationship with said circular cam by means of said notched portion in said circular cam, and said engagement groove and said escapement groove for said eccentric pin being formed in a recess from the surface of said sliding member, whereby said locking means becomes engaged with the steering shaft at its locking position.

* * * * *